United States Patent [19]
Keyes

[11] Patent Number: 5,078,416
[45] Date of Patent: Jan. 7, 1992

[54] DRIVE-SHAFT DRIVEN BICYCLE

[76] Inventor: Kenneth S. Keyes, 1418 Soreson La., Apartment 7, Savannah, Ill. 61074

[21] Appl. No.: 447,190

[22] Filed: Dec. 7, 1989

[51] Int. Cl.$^5$ ............................................. B62M 1/02
[52] U.S. Cl. ............................... 280/260; 280/281.1; 74/423
[58] Field of Search ............... 280/260, 281.1; 74/423, 74/594.1; 464/52, 174; 384/420, 424, 426

[56] References Cited

U.S. PATENT DOCUMENTS

| | | | |
|---|---|---|---|
| 135,293 | 1/1873 | Smith | 74/423 X |
| 446,354 | 2/1891 | Kane | 280/260 |
| 517,739 | 4/1894 | Eisenhart | 280/260 |
| 599,048 | 2/1898 | Turner . | |
| 609,344 | 8/1898 | Harrity | 280/260 X |
| 626,756 | 6/1899 | Hennemeier | 280/260 |
| 1,677,375 | 3/1927 | Tapley | 464/52 |
| 2,793,532 | 2/1954 | Johnson et al. | 464/52 X |
| 2,926,736 | 8/1955 | Lee, Jr. | 464/52 X |
| 3,910,126 | 10/1975 | Felder | 74/11 |
| 4,019,230 | 4/1977 | Pollard | 280/214 |
| 4,112,708 | 9/1978 | Fukuda | 464/174 |
| 4,413,918 | 5/1982 | Thomas | 384/420 X |
| 4,706,982 | 11/1987 | Hartmann | 280/260 |
| 4,741,546 | 5/1988 | Reswick | 280/236 |
| 4,813,917 | 3/1989 | Borden | 474/160 |
| 4,943,077 | 7/1990 | Lin et al. | 280/260 |

FOREIGN PATENT DOCUMENTS

| | | | |
|---|---|---|---|
| 193240 | 10/1918 | Canada | 280/260 |
| 13148 | of 1895 | United Kingdom | 280/260 |
| 12540 | of 1902 | United Kingdom | 280/260 |
| 182535 | 5/1986 | United Kingdom | 384/426 |

*Primary Examiner*—Charles A. Marmor
*Assistant Examiner*—Mitchell Bompey

[57] ABSTRACT

An improved three-speed or coaster bicycle having a driver bevel gear connected to the pedals, a driven bevel gear at the hub of the rear wheel, one or more drive shafts having beveled gears at each end and capable of transmitting the rotation of the driver gear to the driven gear.

12 Claims, 6 Drawing Sheets

DRIVE-SHAFT DRIVEN BICYCLE

BACKGROUND OF THE INVENTION

1. Field of the Invention

This invention relates to coaster and three-speed bicycles, and in particular, to bicycles having bevel gears and one or more drive shafts that replace the traditional spur gears and chain.

2. Description of the Related Art

Traditional coaster or 3-speed bicycles have gears that are changed internally within the hub. Motion from the pedals is transferred to the rear wheels by means of a chain that extends around a sprocket in the pedal area and around a smaller sprocket at the center of the rear wheel.

A number of problems may be associated with these bicycle chains. They are subject to slippage if the length of the chain is not correctly adjusted such as on ten speed derailleurs. Because the chains are often at least partially exposed, clothing, grass, or other objects may become caught in the chains as the chains move past the objects. In addition, dirt and foreign matter can become lodged on the chain links and decrease the efficiency of the chain mechanism. The chain and sprocket mechanism also must be frequently to keep it moving smoothly.

Other types of drive mechanisms have been designed to try to avoid the problems presented by the traditional chain mechanism. For example, in the reciprocating powered bicycle, reciprocating motion instead of rotary motion causes the motion of the pedal to be transferred to the motion of the wheel (U.S. Pat. No. 4,019,230). The bicycle is powered by the use of two roller clutches or ratchets, wherein each is driven by means of one pedal through a portion of a stroke only. In this bicycle, the pedals which are interconnected, are about 90° apart, instead of the traditional 180°.

The bicycle in U.S. Pat. No. 599,048 uses a chain and drive shaft together. In this bicycle a windwheel is mounted forward of the handlebars. Movement of the bicycle by pedalling using a standard sprocket and chain arrangement causes the windwheel to rotate. This rotation causes a shaft to revolve, which in turn causes a beveled gear wheel at the rear wheel to turn to aid in propelling the bicycle. There are still potential problems that are associated with the moving, exposed chain present in this invention.

Another type of bicycle has a variable speed ratio transmission mounted on a bracket connected to the rear axle of the bicycle. It utilizes a flexible V-belt for transmitting rotary motion between a drive pulley of the transmission, and a driven pulley (U.S. Pat. No. 4,741,546). Such a belt also has the problems associated with a long, exposed moving part as are present with the chain of the traditional bicycle, and in addition, this bicycle design retains a number of chains for transmitting torque from the drive pulleys.

Another pedal bicycle with power take-off employs a drive shaft having an axis of rotation radial to a casing and a pedal shaft extending through the casing, such that rotation of the pedals causes the draft shaft to turn and a drive sprocket for a chain to turn. The drive shaft is used to drive a battery-operated motor-generator or a battery charger, or is used to provide power for a bicycle lighting system (U.S. Pat. No. 3,910,126).

In some cases drive shafts have been used with certain motorcycles such as the BMW motorcycle, which may have a single drive shaft. Plural drive shafts have not been used on two-wheeled non-motorized vehicles in a manner to provide an efficient, durable bicycle without a bicycle chain.

It is therefore an object of this invention to provide a bicycle having a means of linear transmission from the pedals to the hub of the bicycle for better efficiency and speed ratios than prior bicycles.

It is a further object of this invention to provide a solution to chain slippage problems by utilizing fewer mechanical parts.

It is also an object of this invention to provide a self-lubricating transmission system that is solid in construction.

It is a further object of this invention to provide a bicycle with a mechanical advantage based on gear and ratio modifications.

Other objects and advantages will be more fully apparent from the following disclosure and appended claims.

SUMMARY OF THE INVENTION

The invention comprises a coaster or three-speed bicycle having bevel gears and a drive shaft mechanism replacing the traditional spur gears and chains. Rotary motion from a driver bevel gear is transferred to the drive shaft(s) and then to a driven bevel gear that is attached to the hub of the rear bicycle wheel.

In summary, the major components of the preferred embodiment of the invention that differ from previous bicycles are:

(a) replacement of the sprocket gears with bevel gears;

(b) replacement of the chain with a drive shaft (second embodiment) or shafts (first embodiment);

(c) a modified rear fork of the bicycle with attachment of brackets to hold the drive shaft(s) in position; and (d) horizontally extended pedal shafts.

According to a broad aspect of the invention, the improved bicycle comprises:

(a) a plurality of brackets;

(b) a driver bevel gear which may be caused to rotate by movement of the first pedal;

(c) a drive shaft mechanism held to the bicycle by the brackets, said drive shaft mechanism having a first end and a second end, said first end and said second end each having a rotatable bevel gear; and (d) a driven bevel gear mounted at the hub of the rear wheel wherein rotation of said driver bevel gear engagingly causes rotation of the rotatable bevel gear on said first end, rotation of said rotatable bevel gear on the first end engagingly causes rotation of the rotatable bevel gear on said second end, rotation of said rotable bevel gear on said second end causes rotation of the driven bevel gear, and rotation of the driven bevel gear causes forward rotation of the rear wheel.

Other aspects and features of the invention will be more fully apparent from the following disclosure and appended claims.

DETAILED DESCRIPTION OF THE INVENTION AND PREFERRED EMBODIMENTS THEREOF

Figure 1:
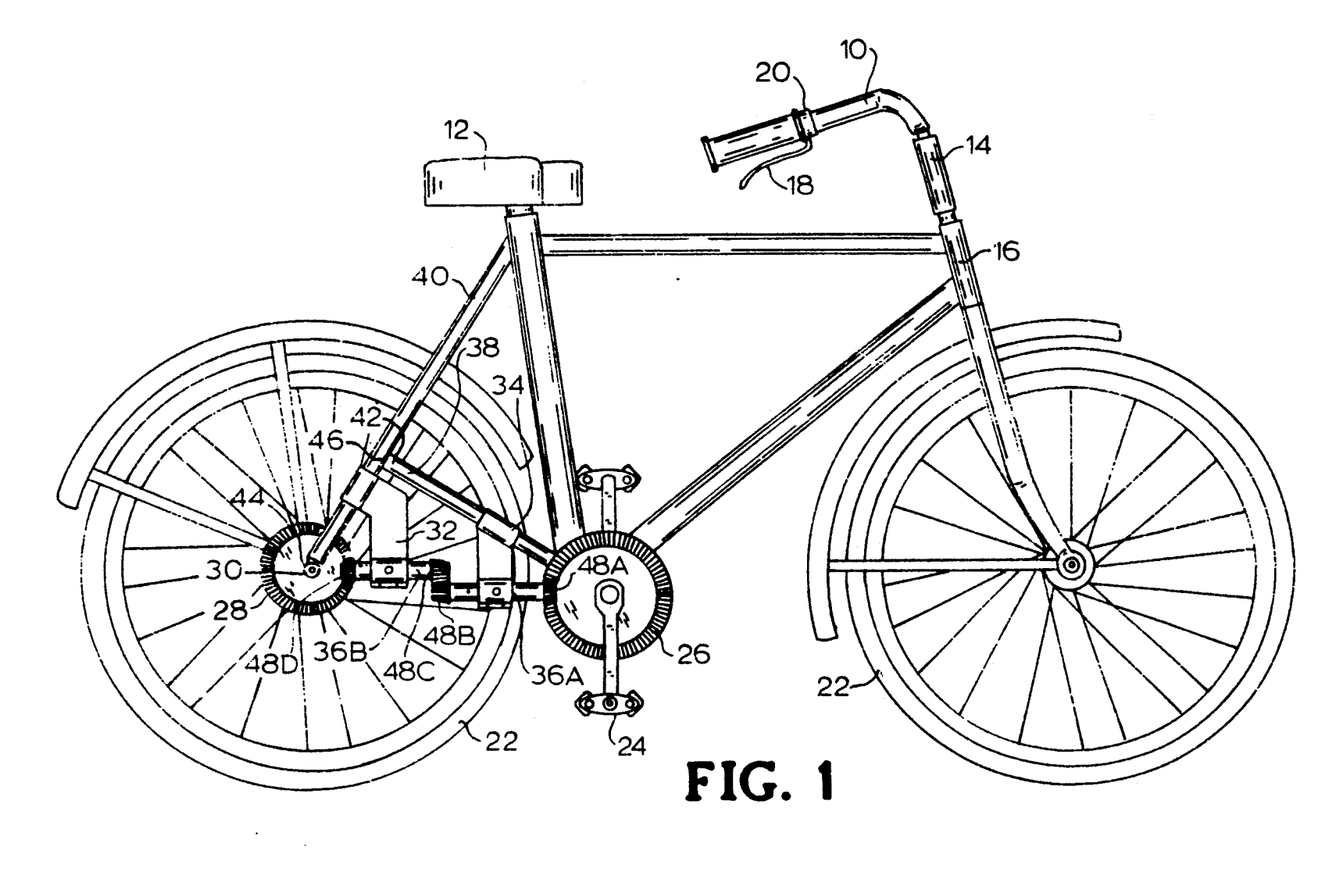
FIG. 1 is a perspective view of a bicycle constructed according to first embodiment of the invention.
Figure 2:
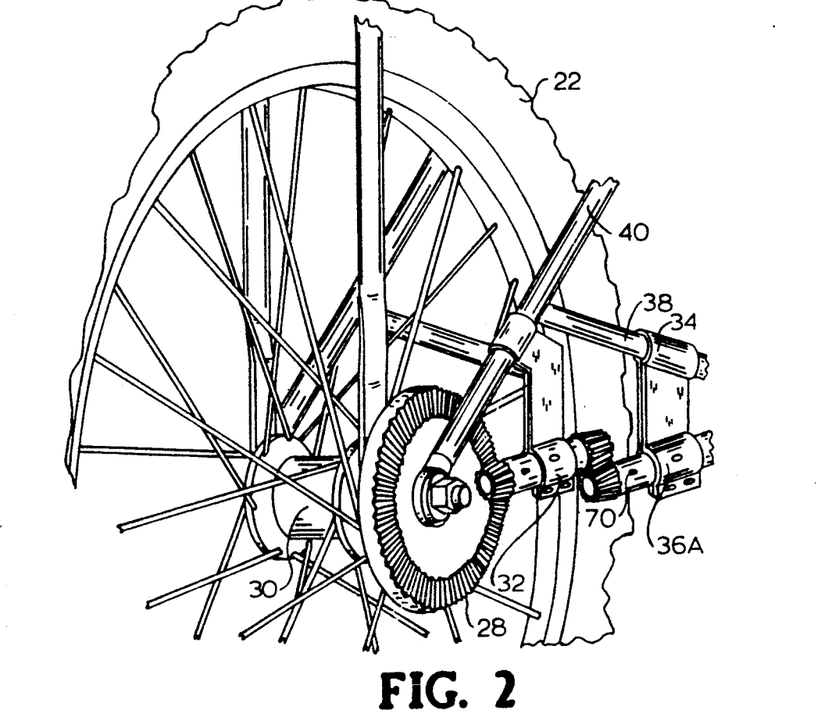
FIG. 2 is a perspective view of a portion of the drive shaft mechanism of the first embodiment of the invention and a three-speed bicycle rear wheel hub modified according to the invention to have a bevel gear substituted for a spur gear.

The present invention comprises a modified traditional three-speed or coaster bicycle having the standard components such as handlebars 10, seat 12, stem 14, headset 16, brake 18, speed selector 20, wheels 22 and pedals 24 which are not modified in this invention (FIG. 1). In the invention, the frame of the bicycle is modified and a drive shaft mechanism replaces the sprocket and chain of traditional three-speed bicycles. Bicycles with derailleurs generally cannot use the drive shaft of the invention in unmodified form because the bevel gears at the end of the drive shaft(s) must remain aligned against the driver gears and driven gears for the invention to work.

Figure 3:
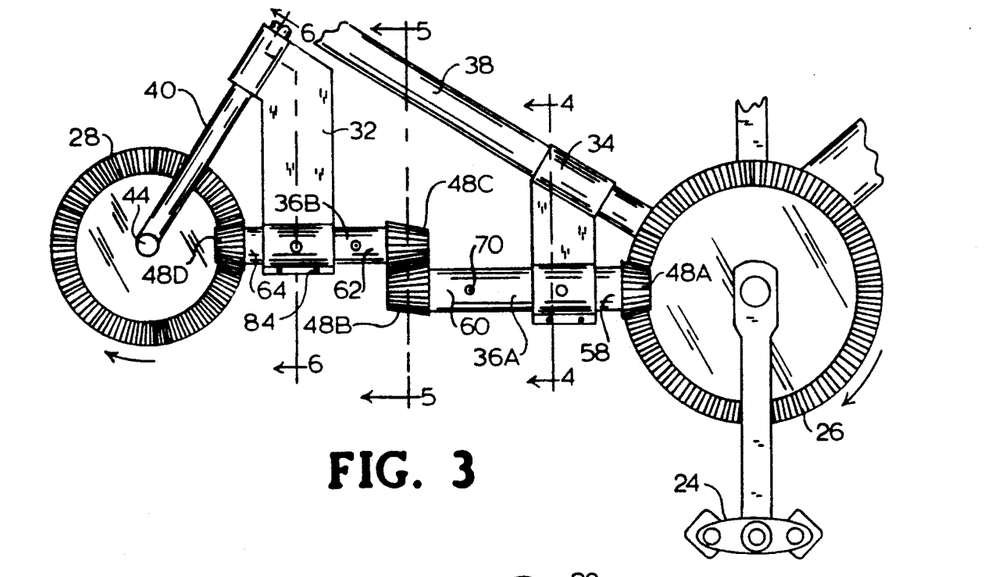
FIG. 3 is an enlarged perspective view of the right side of the twin-drive shaft of the first embodiment of the invention.
Figure 4:
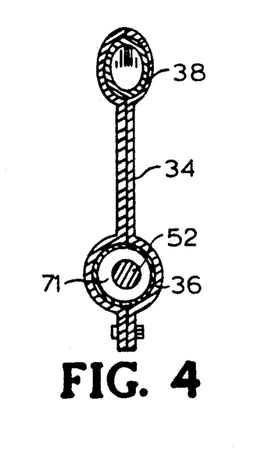
FIG. 4 is cross-sectional view of the drive-shaft taken along line 4—4 in FIG. 3, showing the drive shaft and front bracket of the invention.
Figure 5:
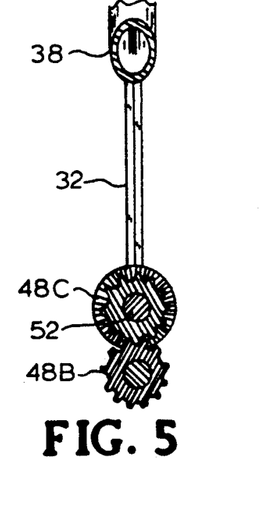
FIG. 5 is cross-sectional view of the drive shaft taken along line 5—5 in FIG. 3, showing the drive shaft bearings and modified frame support of the first embodiment of the invention.

In the bicycle of the invention, a driver bevel gear 26 replaces a traditional drive sprocket gear and a driven bevel gear 28 replaces the traditional sprocket on the rear wheel hub 30. Standard parts, with the exception of the driven bevel gear 28 make up the rear wheel hub used 30 in the invention. Thus, for example the components of the three speed hub of the invention are identical to those of the standard Sturmey-Archer bicycle with the exception of the driven bevel gear 28, which in the hub of the invention replaces the sprocket in the Sturmey-Archer three-speed bicycle. In the invention, the added driven bevel gear 28 in the invention is welded to the standard driver (not shown) which is otherwise a separate piece within the hub assembly. In both the standard bicycle and in the invention, the driver engages the rear wheel. Thus, in the invention, movement of the driven bevel gear 28 causes the attached driver to turn and rotate the rear wheel. Further details of the invention and gear rotation of bicycle of the invention are shown in FIG. 3.

In the first preferred embodiment, a rear bracket 32 and front bracket 34 are connected to drive shafts 36A,B (FIG. 1) that extend between the driver bevel gear 26 and the driven bevel gear 28. The brackets 32,34 provide a frame for supporting and stabilizing the position of the drive shafts 36A,B.

In both preferred embodiments, a modified frame support 38 and fork arm 40 are constructed to provide a position for the drive shaft mechanism of the invention. The frame support 38 of the bicycle is modified by moving its rearward end 42 upward from its attachment site near the hub 44 of the wheel and positioning it at a new elevated attachment point 46 along the fork arm 40 (FIG. 3). This relocation of the rearward portion of the frame support 38 provides a modified rear fork of the bicycle and enables placement of the drive shafts 36A,B of the invention below the frame support 38 (the drive shaft is located where the frame support is traditionally located). Although such a modification is only required for the frame support on the right side of the bike which has the drive shaft(s), both sides are preferably modified for consistency and more uniform support.

The drive shaft mechanism may be comprised of one or more drive shafts, preferably of one flexible drive shaft as in the second embodiment or two drive shafts (as in the first embodiment), or of a multiple of two drive shafts to enable the rear wheel to rotate in the correct direction when the bicycle is pedaled in the normal fashion. If the drive shaft mechanism consists of an odd number of drive shafts, an appropriate direction-reversal mechanism, such as a reversed driver gear (second embodiment), an additional gear, or other means, is included in association with either the pedal or driver gear to provide the correct rotation direction to the driven gear and the rear wheel.

Figure 7:
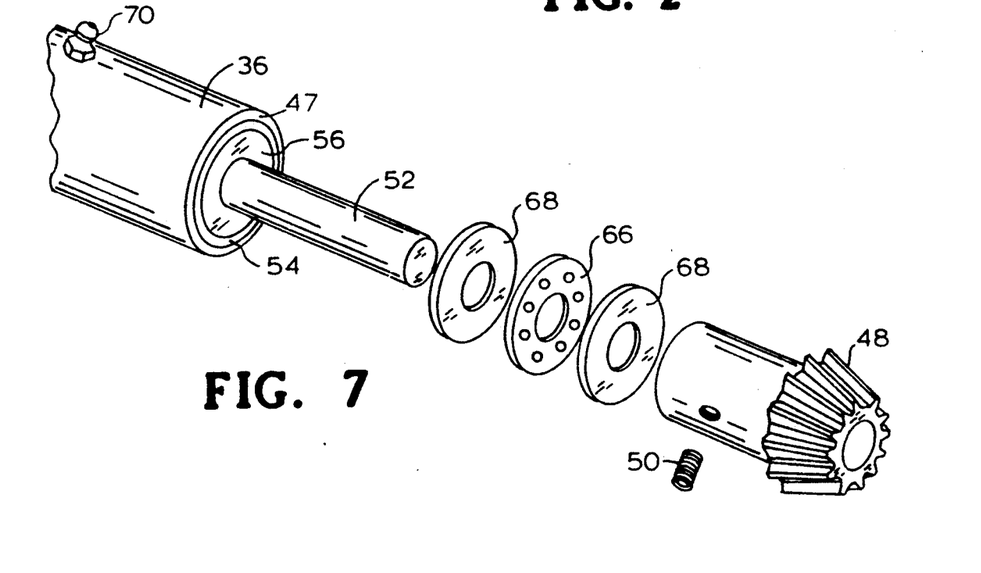
FIG. 7 is an exploded view of one end of a drive-shaft according to the invention.
Figure 8:
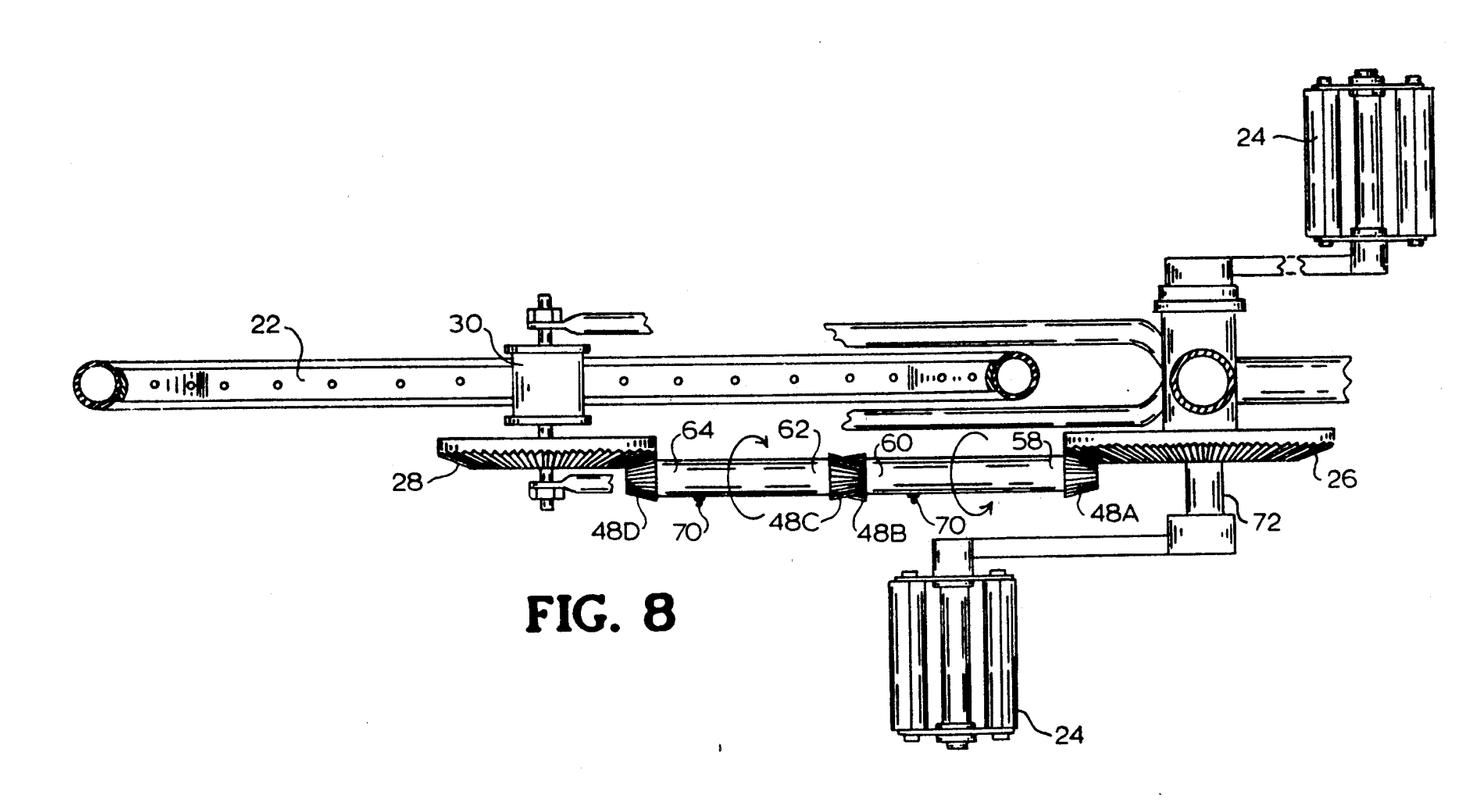
FIG. 8 is a perspective top view of the bicycle showing the location of the assembled gears and drive shafts in the first embodiment of the invention.

In the first embodiment, the drive shaft mechanism is comprised of at least two smaller rigid drive shafts 36A,B (a forward drive shaft 36A and a rearward drive shaft 36B). As shown in FIGS. 1, 3, and 8, each of the two drive shafts 36A,B has a small bevel gear 48(A,B,C, or D) at each end. Each of these small bevel gears 48A-D is attached by means of a set screw 50 to one end of a rod 52 extending down the center of the drive shaft (FIG. 7). As shown in FIG. 7, each drive shaft 36 comprises an outer casing 47 surrounding the rod 52. A standard precision bearing 54 inside the end of each drive shaft 36 having a central rotating cylinder 56 that fits closely to the rod 52, positions the rod 52 centrally within the drive shaft 36 and allows rotation of the rod 52 without rotation of the drive shaft 36.

The forward drive shaft 36A has a small bevel gear 48A at its first end 58 engagingly aligned with the driver bevel gear 26. A small bevel gear 48B at the second end 60 of the forward drive shaft 36A is engagingly aligned with a small bevel gear 48C at the first end 62 of the rearward drive shaft 36B. A small bevel gear 48D at the second end 64 of the rearward drive shaft 36B is engagingly aligned with the driven bevel gear 28 at the rear wheel hub 44. Thus, the four small bevel gears 48A-D, one at each end of each drive shaft 36A,B, enable motion to be transferred from the driver bevel gear 26 to the driven bevel gear 28 on the rear wheel.

Rotation of the driver bevel gear 26 due to motion of the pedals 24 causes the rod 52 within the casing of the first drive shaft 36A to turn counter-clockwise (when viewed from the front) as indicated by the arrow in FIG. 8, which further causes the central rod 52 of the second drive shaft 36B to rotate clockwise due to engagement of the small bevel gears. Rotation in a clockwise direction of the central rod 52 in the second driveshaft 36B and the attached small bevel gear 48D causes the driven bevel gear with which small bevel gear 38D is engaged to rotate in a clockwise direction (FIG. 3) which causes the rear wheel to turn and the bicycle to progress forward.

In association with each small bevel gear 48, a thrust bearing 66 allows fluctuation in gear movement horizontally or vertically. Each thrust bearing is positioned between washers 68 and is located at an end of a drive shaft between the end portion of the drive shaft 36 and the small bevel gear 48 with the rod extending through the washers 68 and the thrust bearing 66 (FIG. 7).

On each drive shaft 36 there is at least one oil cap 70 as is known in the art of drive shafts wherein lubricant may be added to the shaft to lubricate it. Preferably within the shaft, and surrounding the central rod 52 is placed a nearly solid packing grease 71 of the type used in standard bearings.

Movement of the pedals 24 causes the driver bevel gear 26 to rotate in the direction shown (FIG. 3) due to direct attachment of the end of the pedal shaft 72 of the right pedal 24 to the center of the driver bevel gear 26. In both preferred embodiments of the invention, the pedal shaft 72 of the right pedal is modified to be extended outward and away from the driver bevel gear 26 to keep the pedal 24 from becoming entangled in or affecting the motion of the driver bevel gear 26 (FIG. 8). For balance, the pedal shaft on the left side of the bicycle may also be lengthened. Thus, the horizontal portion of the shafts of the pedal(s) where they are connected to the bicycle is longer in the preferred embodiment of the invention than in the traditional three speed bicycle.

Preferably the driver bevel gear 26 is larger than the driven bevel gear 28. A preferred ratio of sizes of the driver bevel gear to the driven bevel gear is about 2 to 1 or greater such that the rear wheel will rotate at twice the speed at which the bicycle is pedaled. No matter what the ratio of these bevel gears, the mechanism for selection of the bicycle speed from the possible three speeds is adjusted by the traditional three-speed mechanism normally found on a bicycle, and is not affected by the invention itself.

In the preferred embodiment: (1) the driver bevel gear 26 may be a gear such as a gear made by Browning Manufacturing Division of Emerson Electric Co. ("Emerson", Maysville, Ky.) having a pitch of 16, pitch diameter of 6.000 and 96 teeth (YSB16B96-60); (2) the small bevel gears may be a gear such as Emerson YSB16B16-60 with a pitch of 16, pitch diameter of 1.000 and 16 teeth; casing drive shafts 36 A,B are each hollow metal pipes with an inner diameter of about ½ inch and lengths of about 7 inches and 8⅜ inches, respectively; and (4) the driven bevel gear maybe a gear such as Emerson YSB16B64-40 with a pitch diameter of 4.000 and 64 teeth. The rotating cylinder 56 in the above preferred embodiment has an outer diameter of about 1⅜" and an inner diameter of about ⅜" (FAFNIR precision bearing No. S5KAS5K, Fafnir Bearing, Torrington, Conn.). Thrust bearings 66 preferably have an outer diameter of about one inch and an inner diameter of ⅜". Gears manufactured from a lighter alloy or other sizes may be used.

Figure 6:
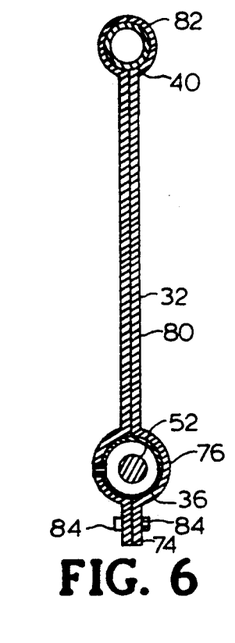
FIG. 6 is a cross-sectional view of the drive shaft taken along line 6—6 in FIG. 3, showing the drive shaft and rear bracket of the invention.

The drive shafts 36 of the first preferred embodiment of the invention are each attached to bracket 32, 34 to hold the drive shaft 36 in place between the driver bevel and gear 26 and driven bevel gears 28. The brackets 32,34 are preferably made of formed or molded flat metal sheets, such as stainless steel. For ease of manufacturing, each bracket comprises two side halves positioned in a mirror image to each other when viewed from the front or back of the bicycle as shown for the rear bracket 32 (FIG. 6) as follows: an upwardly extending uncurved lower fastening extension 74, extending upward to a lower, semicircular expansion 76 that extends upward and around one of the drive shafts 36 A,B or end-pieces 78 A,B to an upward extension 80, which is contiguous to the corresponding bracket on the other side, to an upper semicircular expansion 82 that extends around, and is welded to, either the modified frame support 38 for bracket 34 or the fork arm for bracket 32. The two fastening extensions 74 are fastened together by means of bolts 84 to allow for replacement of the drive shafts 36A,B, or the end pieces 78A,B. Set screws (not shown) may also be used to hold the lower extension to the drive shaft or end piece. The upward extension 80 when viewed from the side of the bicycle is preferably angled upward and forward for bracket 34 and upward and backward for bracket 32. The brackets 32,34 are not attached to the small bevel gears 48 at either end of either drive shaft 36 so that the small bevel gears 48 are free to rotate.

The actual shape of the brackets and the extent and type of their attachment to the drive shaft and to the bicycle frame may be varied to take into account any design or strength purposes of importance. The brackets are made of a metal such as steel or another sturdy metal or metal alloy or other strong durable material. These brackets 32,34 enable the drive shaft 36 to be held in place as the bevel gears 48 at each end turn, or are turned by the internal rod 52 within the drive shaft. Each drive shaft 36 thus serves as a housing for the rotatable internal rod 52 and is fixed in its position by means of the brackets 32,34.

Figure 9:
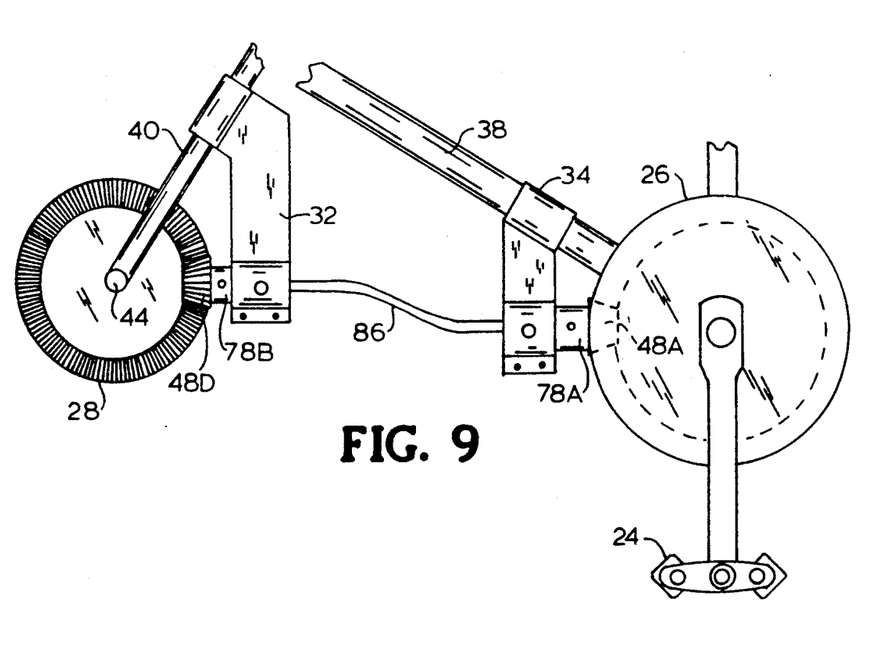
FIG. 9 is a pespective view of the right side of a flexible drive shaft of a bicycle constructed according to a second embodiment of the invention.

In the second embodiment (FIGS. 9–10), the two drive shafts 36A,B of the first embodiment are replaced by two end pieces 78 A,B connected by a flexible drive shaft 86. Parts of the end pieces that are equivalent to parts of the drive shaft are indicated by the same identifying numbers in the Figures. Each end piece comprises a small bevel gear 48 (48A for endpiece 78A and 48D for end piece 78B), which as in the drive shafts is attached by means of a set screw 50 to one end of a rod 52 extending down the center of the endpiece inside the casing. The same bearings (not shown) as in the drive shaft of the first embodiment allows the same bearings rotation mechanism to function in the second embodiment.

The end pieces 78 A,B of the second embodiment differ from the first embodiment driveshafts 36A,B in that the bevel gears 48 B,C are replaced by a flexible drive shaft 86 extending between the end pieces. The flexible drive shaft 86 is preferably comprised of an inner coil 88 made of wire wound steel or ferric material and having a diameter of 0.10–0.50 inches. A speedometer-type cable construction has appropriate flexiblilty for use in making the coil.

The coil 88 is placed within a tube or sheath 90 of plastic, rubber or other flexible material. The purpose of the sheath is to protect, house and provide lubrication for the coil. Each end of each coil 88 is flattened and inserted into a hole in the end of the rod of an end piece and is held there by a set screw 92.

A steel plug 94 having a central opening to contain the sheath and coil (the sheath exits through the opening) is placed at the end of each end piece, to which the coil 88 is attached and is held there by a pressed fit i.e., precision bearings into the drive shaft casing.

Figure 10:
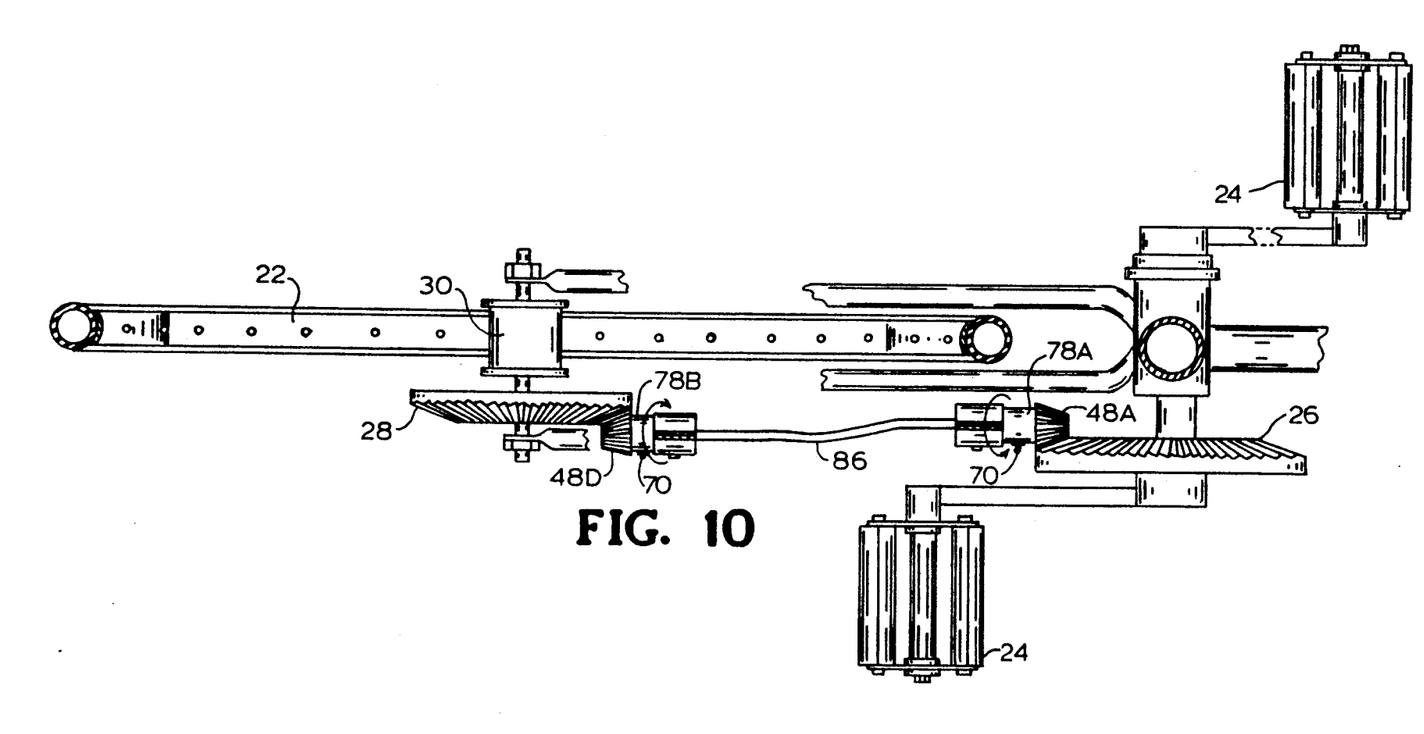
FIG. 10 is a perspective top view of the bicycle showing the location of the assembled gears and drive shaft in the second embodiment of the invention.
Figure 11:
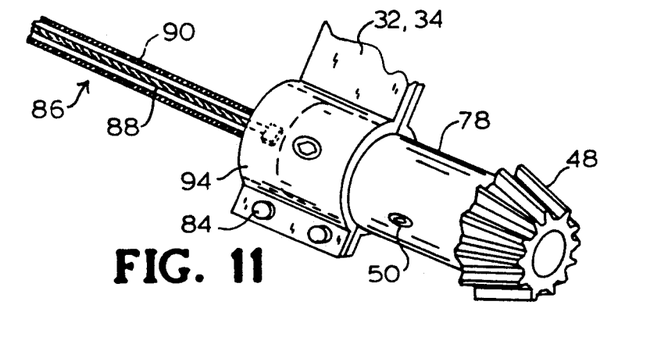
FIG. 11 is a perspective view of an end piece and part of a flexible drive shaft according to the second embdiment of the invention.

As with the first embodiment, the bevel gears 48A,D in the second embodiment are held in place against the drive or driven bevel gears, respectively, by brackets 34 and 32, respectively. In order to make the direction of rotation of the pedal translate into forward motion of the bicycle, however, the driver bevel gear in the second embodiment, has its beveled edge facing toward the center of the bike as shown in FIG. 10 and not outward as in the first embodiment. Because this orientation of the driver bevel gear and associated bevel gear 48A, the pedal shaft in the second embodiment does not need to be extended.

Movement of the bicycle of the second embodiment thus occurs through the following sequence: rotation of the pedal causes the driver gear 26 to rotate which causes bevel gear 48A to rotate, which causes rod 52 in end piece 78A to rotate clockwise (when viewed from the front). This causes the coil 88 within the flexible drive shaft 86 to rotate clockwise which causes rod 52 in endpiece 78B to rotate counterclockwise. The remaining rotations of the bevel gear 48D and drive bevel gear 28 are the same as in the first embodiment.

While the invention has been described with reference to specific embodiments thereof it will be appreciated that numerous variations, modifications and embodiments are possible, and accordingly, all such variations, modifications, and embodiments are to be regarded as being within the spirit and scope of the invention.

What is claimed is:

1. An improved bicycle of the type having a front wheel, a rear wheel having a hub, a rear fork and a first pedal and a second pedal, wherein the improvement comprises:
   (a) a plurality of brackets;
   (b) a driver bevel gear which may be caused to rotate by movement of the first pedal;
   (c) a drive shaft mechanism held to the bicycle by the brackets, said drive shaft mechanism comprising at least one casing, each casing enclosing a rod rotatable within said casing, said rive shaft mechanism having a first end and a second end, said first tend and said second end each having a rotatable bevel bear, each rotatable bevel gear being nonrotatably attached to an end of a rod;
   (d) a driven bevel gear mounted at the hub of the rear wheel; wherein said rive shaft mechanism extends between said driven bevel gear and said river bevel gear and wherein rotation of said river bevel gear engagingly causes rotation of the rotatable bevel gear on said first end, rotation of said rotatable bevel gear on the first end engagingly causes rotation of the rotatable bevel gear on said second end by turning the attached rod, rotation of said rotatable bevel gear on said second end causes rotation of the driven bevel gear, and rotation of the driven bevel gear causes forward rotation of the rear wheel; and
   (e) a frame support extending linearly, at an angle above the drive shaft mechanism, between the pedals and a position on the rear fork above the hub of the rear wheel, said frame support being farther from the drive shaft mechanism at the rear fork than it is from the drive shaft mechanism near the pedals, and said drive shaft mechanism being attached to said frame support by a bracket located toward said first end of the drive shaft mechanism.

2. An improved bicycle according to claim 1, wherein:
   (a) said drive shaft mechanism comprises a flexible drive shaft having a first end and a second end;
   (b) said first end of said drive shaft mechanism comprises a first rotatable bevel gear nonrotably attached to said first end of said flexible drive shaft, said first rotatable bevel gear being held in place against the driver bevel gear by a first bracket, said first bracket being attached to the frame support;
   (c) said second end of said rive shaft mechanism comprises a second rotatable bevel gear nonrotatably attached to said second end of said flexible drive shaft, said second rotatable bevel gear being held in place against the driven bevel gear by a second bracket; and
   (d) said river bevel gear has a beveled area facing toward the second pedal, wherein said beveled area engages said first rotatable bevel gear on said first end.

3. An improved bicycle according to claim 1, wherein:
   (a) said drive shaft mechanism comprises a plurality of drive shafts, said plurality of drive shafts comprises a first drive shaft and a second drive shaft, said first drive shaft and said second drive shaft extend along axes that are parallel to each other, each of said drive shafts has an internal rod, each of said internal rods is connected to a forward bevel gear and a rearward bevel gear, wherein:
      (i) rotation of each forward bevel gear causes rotation of the connected rod and of the rearward bevel gear connected to the same rod;
      (ii) rotation of said driver bevel gear engagingly rotates the forward bevel gear on the first drive shaft;
      (iii) rotation of the rearward gear on the first drive shaft engagingly rotates the forward gear on the second drive shaft; and
      (iv) said driver bevel gear has a beveled area facing toward the first pedal and away from the second pedal, wherein said beveled area engages said forward bevel gear on said first drive.

4. An improved bicycle according to claim 1 wherein the bicycle has a modified frame support, the brackets comprise a forward bracket and a rearward bracket, said forward bracket is attached to the modified frame support and to the first end of the drive shaft mechanism, and said rearward bracket is attached to the rear fork and the second end of the drive shaft mechanism.

5. An improved bicycle according to claim 1 further comprising an elongated pedal shaft on the first pedal.

6. An improved bicycle according to claim 1, wherein the driver bevel gear is larger than the driven bevel gear.

7. An improved bicycle according to claim 1, wherein the drive shaft mechanism comprises an oil cap whereby lubricant may be added within the casing and around the rod.

8. An improved bicycle according to claim 3, wherein a thrust bearing is located on each end of each drive shaft.

9. An improved bicycle according to claim 2, wherein the flexible drive shaft comprises a flexible coil and a flexible sheath surrounding the coil.

10. A bicycle, comprising:
(a) a three-speed hub comprising a driven bevel gear attached to a driver;
(b) a driver bevel gear which may be caused to rotate by movement of a first pedal of the bicycle;
(c) a plurality of brackets;
(d) a drive shaft mechanism held to the bicycle by the brackets and extending between said driven bevel gear and said driver bevel gear, said drive shaft mechanism comprising at least one casing, each casing enclosing a rod rotatable within said casing, said drive shaft mechanism having a first end and a second end, each of said ends having a rotatable bevel gear attached to an end of a rod; and
(e) a frame support extending linearly, at an angle above the drive shaft mechanism, between the pedals and a position on the rear fork above the hub of the rear wheel, said frame support being farther from the drive shaft mechanism at the rear fork than it is from the drive shaft mechanism near the pedals, and said drive shaft mechanism being attached to said frame support by a bracket located toward said first end of the drive shaft mechanism;
wherein rotation of said driver bevel gear engagingly causes rotation of the rotatable bevel gear on said first end, rotation of said rotatable bevel gear on the first end engagingly causes rotation of the rotatable bevel gear on said second end by turning the attached rod, rotation of said rotatable bevel gear on said second end causes rotation of the driven bevel gear, and rotation of the driven bevel gear causes forward rotation of the rear wheel.

11. A bicycle, according to claim 10, wherein:
(a) said drive shaft mechanism comprises a flexible drive shaft having a first end and a second end;
(b) said first end of said drive shaft mechanism comprises a first rotatable bevel gear nonrotably attached to said first end of said flexible drive shaft, said first rotatable bevel gear being held in place against the driver bevel gear by a first bracket, said first bracket being attached to the frame support;
(c) said second end of said drive shaft mechanism comprises a second rotatable bevel gear nonrotatably attached to said second end of said flexible drive shaft, said second rotatable bevel gear being held in place against the driven bevel gear by a second bracket; and
(d) said driver bevel gear has a beveled are facing toward the second pedal, wherein said beveled are engages said first rotatable bevel gear on said first end.

12. A bicycle, comprising:
(a) a three-speed hub comprising a driven bevel gear attached to a driver;
(b) a driver bevel gear which may be caused to rotate by movement of a first pedal of the bicycle;
(c) a plurality of brackets;
(d) a drive shaft mechanism held to the bicycle by the brackets and extending between said driven bevel gear and said driver bevel gear, said drive shaft mechanism comprising at least one casing, each casing enclosing a rod rotatable within said casing, said drive shaft mechanism comprising a flexible drive shaft having a first end and a second end, each of said ends having a rotatable bevel gear attached to an end of a rod; and
(e) a frame support extending linearly, at an angle above the drive shaft mechanism, between the pedals and a position on the rear fork above the hub of the rear wheel, said frame support being farther from the drive shaft mechanism at the rear fork than it is from the drive shaft mechanism near the pedals, and said drive shaft mechanism being attached to said frame support by a bracket located toward said first end of the drive shaft mechanism;
(f) said first end of said drive shaft mechanism comprising a first rotatable bevel gear nonrotably attached to said first end of said flexible drive shaft, said first rotatable bevel gear being held in place against the driver bevel gear by a first bracket, said first bracket being attached to the frame support;
(g) said second end of said drive shaft mechanism comprises a second rotatable bevel gear nonrotatably attached to said second end of said flexible drive shaft, said second rotatable bevel gear being held in place against the driven bevel gear by a second bracket; and
(h) said driver bevel gear has a beveled area facing toward the second pedal, wherein said beveled area engages said first rotatable bevel gear on said first end;
wherein rotation of said driver bevel gear engagingly causes rotation of the rotatable bevel gear on said first end, rotation of said rotatable bevel gear on the first end engagingly causes rotation of the rotatable bevel gear on said second end by turning the attached rod, rotation of said rotatable bevel gear on said second end causes rotation of the driven bevel gear, and rotation of the driven bevel gear causes forward rotation of the rear wheel.

* * * * *

UNITED STATES PATENT AND TRADEMARK OFFICE
CERTIFICATE OF CORRECTION

PATENT NO. : 5,078,416

DATED : January 7, 1992

INVENTOR(S) : Kenneth S. Keyes

It is certified that error appears in the above-identified patent and that said Letters Patent is hereby corrected as shown below:

Column 7, line 46, "rive" should be --drive--.
(PTO error)

Column 7, line 52, "rive" should be --drive--.

Column 7, line 53, "river" should be --driver--.

Column 7, line 54, "river" should be --driver--.

Column 8, line 16, "rive" should be --drive--.

Column 8, line 22, "river" should be --driver--.

UNITED STATES PATENT AND TRADEMARK OFFICE
CERTIFICATE OF CORRECTION

PATENT NO. : 5,078,416

DATED : January 7, 1992

INVENTOR(S) : Kenneth S. Keyes

It is certified that error appears in the above-identified patent and that said Letters Patent is hereby corrected as shown below:

Column 9, line 51, "are" should be --area--.

Column 9, line 52, "are" should be --area--.

Signed and Sealed this

Thirtieth Day of March, 1993

*Attest:*

STEPHEN G. KUNIN

*Attesting Officer*     *Acting Commissioner of Patents and Trademarks*